United States Patent
Prebio

(10) Patent No.: US 9,051,920 B2
(45) Date of Patent: Jun. 9, 2015

(54) DEVELOPMENT OF A NEW TOWER CABLING

(75) Inventor: Peter Prebio, Villach (AT)

(73) Assignee: AMSC Austria GmbH, Klagenfurt am Wörthersee (AT)

( * ) Notice: Subject to any disclaimer, the term of this patent is extended or adjusted under 35 U.S.C. 154(b) by 918 days.

(21) Appl. No.: 12/528,504

(22) PCT Filed: Mar. 24, 2009

(86) PCT No.: PCT/EP2009/053454
§ 371 (c)(1),
(2), (4) Date: Oct. 15, 2009

(87) PCT Pub. No.: WO2010/108538
PCT Pub. Date: Sep. 30, 2010

(65) Prior Publication Data
US 2010/0247326 A1   Sep. 30, 2010

(51) Int. Cl.
*F03D 11/00* (2006.01)

(52) U.S. Cl.
CPC .......... *F03D 11/00* (2013.01); *Y10T 29/49316* (2015.01); *F03D 11/0066* (2013.01); *Y02E 10/722* (2013.01); *Y02E 10/726* (2013.01)

(58) Field of Classification Search
CPC ... F03D 11/00; F03D 11/0066; Y02E 10/722; Y02E 10/726; Y10T 29/49316
USPC ..................... 415/4.3, 4.5; 416/146 R, 244 R
See application file for complete search history.

(56) References Cited

U.S. PATENT DOCUMENTS

| 6,374,022 B1 | 4/2002 | Parmigiani et al. |
| 6,713,891 B2 | 3/2004 | Kirkegaard et al. |
| 2006/0199411 A1 | 9/2006 | Singh et al. |
| 2007/0246613 A1 * | 10/2007 | Kennedy .......................... 248/56 |

FOREIGN PATENT DOCUMENTS

| CA | 2475261 | 1/2006 |
| EP | 1406363 | 4/2004 |
| GB | 2440954 | 2/2008 |
| JP | 2005-137097 | 5/2005 |
| JP | 2006-246549 | 9/2006 |
| JP | 2008-298051 | 12/2008 |
| WO | 2004/021059 | 3/2004 |

OTHER PUBLICATIONS

Machine Translation of JP 2005-137097, PAJ.*
Machine Translation of JP 2006-246549, PAJ.*

* cited by examiner

*Primary Examiner* — Edward Look
*Assistant Examiner* — Jesse Prager
(74) *Attorney, Agent, or Firm* — Occhiuti & Rohlicek LLP

(57) ABSTRACT

A cable suspension arrangement includes a first suspension means for suspending the first plurality of cables at a nacelle; a second suspension means which is attachable to the nacelle; a second plurality of spacer plates each including a suspension hole and each including a third plurality of cable through-holes; wherein the second suspension means is led through the suspension holes; a fixing means for fixing the spacer plates at different positions on the second suspension means such that they can at least not lower their respective position; wherein the cables can be slidably led through the through-holes.

8 Claims, 6 Drawing Sheets

DEVELOPMENT OF A NEW TOWER CABLING

CROSS-REFERENCE TO RELATED APPLICATIONS

This application is the National Stage of International Application No. PCT/EP2009/053454, filed on Mar. 24, 2009. The contents of which is hereby incorporated by reference in its entirety.

BACKGROUND

Cable Suspension Arrangement for a Wind Energy Converter, Corresponding Mounting Method and Corresponding Spacer Plate The present invention relates to a cable suspension arrangement for a wind energy converter, to a corresponding mounting method and to a corresponding spacer plate.

A wind energy converter is a rotating machine which converts the kinetic energy in wind into electricity and feeds the electricity into the electrical grid.

A wind energy converter generally includes a nacelle disposed on a tower. The nacelle (also called gondola) includes a rotor head equipped with blades and a main shaft connected to the rotor head so as to integrally rotate with the rotor head. Moreover, the nacelle can rotate around a vertical axis so as to actively or passively follow the wind direction.

A first type of nacelle further includes a gear box connected to the main shaft that rotates upon receiving the wind power supplied to the blades, and a generator driven by an output shaft from the gear box. According to the wind energy converter having this structure, the rotor head equipped with the blades converts wind power into a rotational force, and the main shaft rotates to generate a first rotational speed. The first rotational speed is increased via the gear box connected to the main shaft, and a corresponding second larger rotational speed is transmitted to the rotor of the generator. A second type of nacelle without gear box uses direct drive turbines with DC generators. Special high power electronics convert from DC to AC electricity.

The electrical energy produced by the generator will be transferred by cables which are installed in the tower. Since the nacelle must always turn the rotor into the wind direction and the desired range of yawing is two revolutions clockwise and two revolutions counter clockwise, the power cabling will be highly stressed and there is the potential risk of damage.

FIG. 5 is a side view showing an example of the conventional overall structure of a wind energy converter.

As shown in FIG. 5, a wind energy converter 1 includes a tower 2 disposed on a foundation 6, a nacelle 3 provided on the upper end of the tower 2 which is rotatable around a substantially vertical axis B, and a rotor head 4 provided on the nacelle 3 including a hub for fixing rotor blades 5 which rotor head 4 is rotatable around a substantially horizontal axis A.

A plurality of blades 5 is attached to the rotor head 4 so as to be radially disposed around the rotation axis A. Thereby, wind power supplied to the blades 5 from the direction of the variable rotation axis A of the rotor head 4 is converted into mechanical power for rotating the rotor head 4 around the rotation axis.

FIG. 6 is an example of a conventional cable suspension arrangement of the wind energy converter of FIG. 5.

As depicted in FIG. 6, a nacelle 3 (only part of the contour of a main frame is shown in FIG. 6) is supported on bearings 25 which are located on a platform 20 on top of the tower 2. Reference signs L1, L2, L3 denote a first, second and third cable, which connect a not-shown generator in the nacelle 3 with the electrical grid. For the sake of simplicity, only three cables L1, L2, L3 are shown here; however, normally there are between 15 and 50 cables which have to be bundled and let down from the top of the tower 2 to the bottom of the tower 2.

Since the cables L1, L2, L3 typically have a cross-section of 150 mm$^2$ or more and have a length between 10 and 15 m, it is necessary to implement a suspension means for stress relief, cable guide means and cable spacing means.

Conventionally, the suspension means is realized as a cable stocking arrangement as schematically depicted as H1, H2, H3 in FIG. 6. Specifically, each cable L1, L2, L3 wears a cable stocking which is hooked to a part of the nacelle 3 so as to be rotatable together with the nacelle 3.

Moreover, there is spacer plate 31 having through-hole 61, and spacer plate 32 having through-hole 71, where the cables L1, L2, L3 are led through and either clamped therein or fixed thereto by cable ties. The spacer plates 31, 32 are fixed to the tower 2 wall by a respective fixing means 312, 322.

If the nacelle 3 rotates, the cables L1, L2, L3 are drawn upwards.

Below the second spacer plate 32 the cables L1, L2, L3 are guided to the sidewall of the tower 2 via a so-called cable loop L and via a supporting cylinder 40. The supporting cylinder 40 is fixed at the sidewall of the tower 2 by a corresponding fixing means 41 denoted by dashed lines in FIG. 6.

Moreover, there is a fixture 50 attached to the sidewall of the tower 2 which fixes the cables L1, L2, L3 in corresponding through-holes 51, 52, 53, e.g. by a clamping mechanism or by cable ties.

Upon rotation of the nacelle 3, the cable loop L can move upwards and downwards along the direction of the arrow P3 so as to vary the free length of the cables L1, L2, L3.

It should be noted that the length of the cable loop L (typically 2.5 m) is arranged such that the twist and upward and downward movement of each cable L1, L2 and L3 can be absorbed.

Since the fixture 50 is not pivotable and there is the supporting cylinder 40, a transfer of the cable twist to the tower 2 sidewall can be prevented.

Upon turning of the nacelle 3 up to two revolutions, the power cabling and suspension parts will be highly stressed. While turning, cable ties can damage the casing of the cables. The inner surface of the spacer plates 31, 32 can also damage the casing of the cables. Moreover, there are heat dissipation problems in conjunction with the cables L1, L2, L3 because they are densely packed at the spacer plates 31, 32. In other words, this arrangement impedes sufficient heat dissipation.

Finally, the installation of the cabling and guiding of the cables is complex. After the nacelle 3 is connected to the top of the tower 2, all tower cables have to be installed into the spacer plates and fixtures by hand, and in the case of the use of cable ties, each individual cable tie has to be fixed manually.

Thus, a worker has to climb up and down several times in order to install the cabling in the correct way. For the crimping of the cables to the tower wall, the worker needs heavy tools. In order to uninstall the nacelle to change the gear box, the worker has to cut the cabling and then has to re-install the cabling after replacement of the nacelle 3. In this case, the worker needs heavy tools and to climb up and down the tower several times.

U.S. Pat. No. 6,713,891 B2 discloses a wind turbine including a cable suspension and cable spacing devices for maintaining a constant distance between the cables hanging down through the tower. The stable spacing devices are suspended down along a wire or a rope. The cable spacing devices have a polygonal or circular circumference and are provided with slots that extend from the circumference towards the centre. The centre is provided with a hole through which the wire or rope on which the cable spacing device is suspended can run. The cables are clamped at the inner ends of the slots.

SUMMARY

The present invention provides a cable suspension arrangement for a wind energy converter, a corresponding mounting method, and a corresponding spacer plate.

In a general aspect, a cable suspension arrangement for suspending a plurality of cables for a wind energy converter comprises a first suspension means for suspending the first plurality of cables at the nacelle, a second suspension means which is attachable to the nacelle, and a second plurality of spacer plates each including a suspension hole and each including a third plurality of cable through-holes. The second suspension means is led through the suspension holes, and a fixing means is provided for fixing the spacer plates at different positions on the second suspension means such that they can at least not lower their respective position. The cables are slidably led through the through-hole.

Further embodiments are listed in the respective dependent claims.

In another aspect, a cable suspension arrangement of a wind energy converter including a tower and a nacelle provided on the tower includes a plurality of spacer plates each including a suspension hole and a plurality of cable through-holes, the plurality of cable through-holes configured to receive a plurality of cables suspended from the nacelle; a suspension device attached to the nacelle and led through the suspension holes; and a fastener configured to fix the spacer plates at different positions on the suspension device such that they can at least not lower their respective position.

Embodiments may include one or more of the following. At least one of the spacer plates is attached to the tower such that it cannot rotate around a rotation axis of the nacelle. At least one of the spacer plates is the lowermost spacer plate. At least one of the spacer plates is the uppermost spacer plate. The suspension device is wire-like, rope-like, or rod-like. The fastener includes clamping fasteners.

The cable suspension arrangement further includes a guide inserted into the suspension holes, the guide configured to guide an upward motion of the spacer plates along the suspension device. The guide exhibits a sleeve form. The cable through-holes have rounded edges at the lower and upper surface of the spacer plates. The spacer plates have a circular shape. The suspension holes are positioned in the center of the spacer plates. The spacer plates further include a plurality of heat transport holes. The heat transport holes are distributed between a first and second radius from the center suspension hole. The cable through-holes are distributed beyond the second radius from the center suspension hole.

In another embodiment, a mounting method of a cable suspension arrangement of a wind energy converter including a tower and a nacelle provided on the tower includes providing a cable suspension arrangement, temporarily fixing the cable suspension arrangement on the tower, mounting a main frame of the nacelle, fixing the cable suspension arrangement on the main frame of the nacelle, and removing the temporary fixing.

Embodiments may include one or more of the following. The temporarily fixing of the cable suspension arrangement on the tower is performed on a top platform of the tower. The temporarily fixing of the cable suspension arrangement on the tower is performed by attaching a suspension device to the tower. The method further includes the step of electrically connecting cables to the wind energy converter with electrical connectors.

In a further aspect, a spacer plate for a cable suspension arrangement for a wind energy converter includes a suspension hole and a plurality of cable through-holes. The cable through-holes have rounded edges at the lower and upper surface of the spacer plates.

Embodiments may include one or more of the following. The spacer plate further includes a plurality of heat transport holes. The spacer plate has a circular shape. The suspension holes are positioned in the center of the spacer plates. The heat transport holes are distributed between a first and second radius from the center suspension hole. The cable through-holes are distributed beyond the second radius from the center suspension hole.

This cable suspension arrangement provides significant advantages.

The size and design of the cable suspension arrangement can be individually fitted to the requirements of each particular wind energy converter.

A gentle guiding of the power cabling while maintaining the respective positions of the cable in the centre of the tower can be realized. No damage of the casing of each tower cable due to cable ties or friction occurs. Profitable and safe temporary installation of the whole tower cabling in the horizontal tower platform is possible.

The open space between each tower cable in connection with heat transport holes provides very effective heat dissipation. There is no influence on the ampacity of the cables.

Interfaces between tower cabling and cabling in the nacelle can be realized in form of connector plugs. The connector plugs provide a convenient way to remove the nacelle from the top of the tower as often as needed.

The new design can be used for all types of wind energy converters no matter how many tower cables are used. In contrast to known solutions, the guiding and spacing is variable and does not clamp the cables to the spacer plates. The design and material of the guiding ensures an essential space between the cables and thus the friction between the cables and between the cables and the guiding can be avoided. With its variability, the guiding follows the motion of the twisting cables and ensures a controlled and secured cable twist.

All these above-mentioned advantages will help to reduce the overall cost in wind turbine manufacturing based on easier assembling and longer life cycles of the cables.

Further aspects are illustrated in the accompanying drawings and described in detail in the following part of the description.

FIGURES

In the Figures.

Throughout the figures the same reference numbers indicate the same or functionally equivalent means. It should be noted that the individual figures for explaining specific modes of operation do not include all details, but just the details needed for explaining the respective mode.

DETAILED DESCRIPTION

Figure 1:
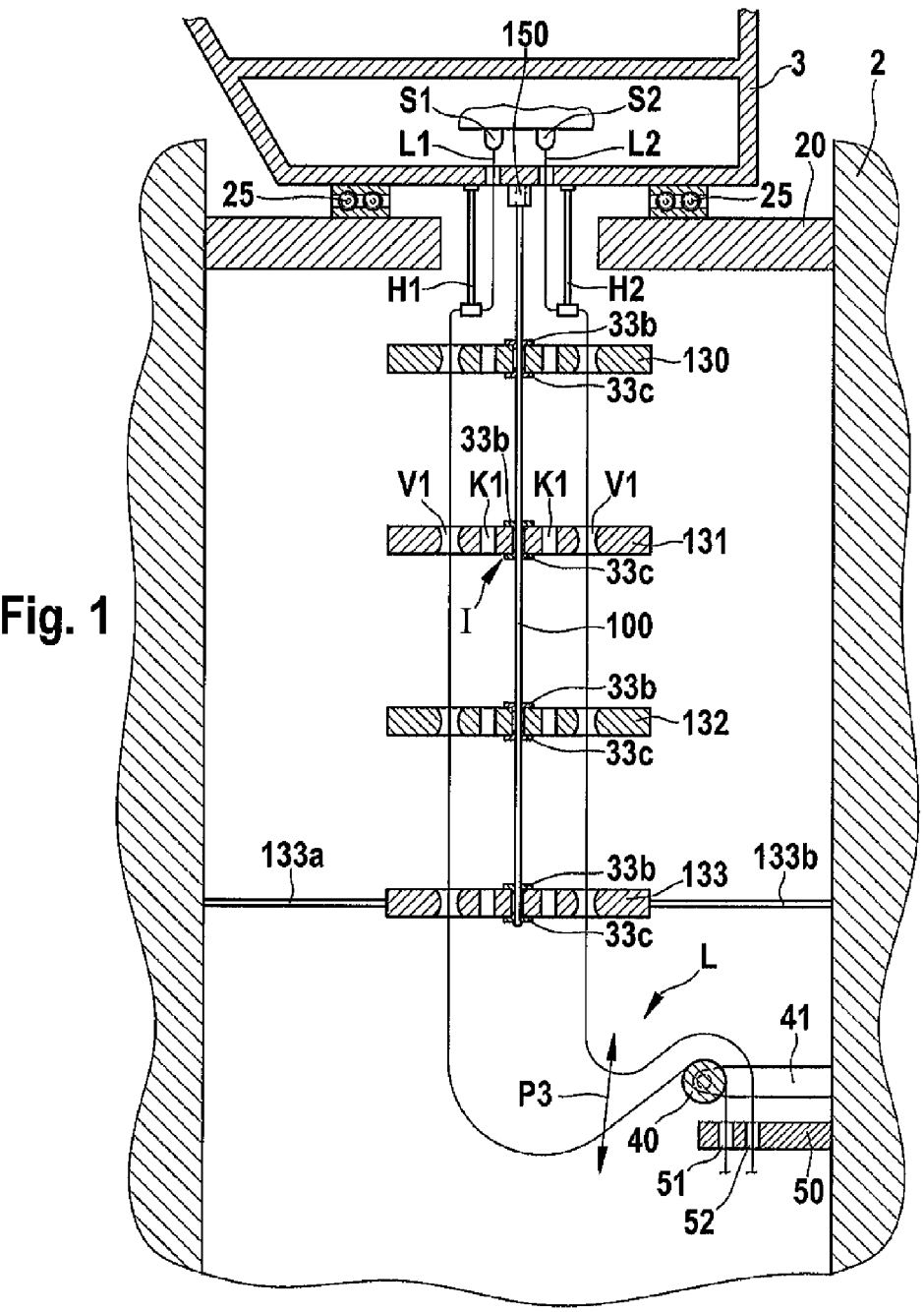
FIG. 1 is a schematic cross-sectional view of a cable suspension arrangement for a wind energy converter.

FIG. 1 is a schematic cross-sectional view of a cable suspension arrangement for a wind energy converter.

As depicted in FIG. 1, a nacelle 3 (only part of the contour of a main frame is shown in FIG. 1) is supported on bearings 25 which are located on a platform 20 on top of the tower 2. Reference signs L1, L2 denote a first and second cable, which connect a not-shown generator in the nacelle 3 with the electrical grid. For sake of simplicity, only two cables L1, L2 are shown here; however, normally there are between 15 and 50 cables which have to be bundled and let down from the top of the tower 2 to the bottom of the tower 2. The cables L1, L2 typically have a cross-section of 150 mm$^2$ or more and have a length between 10 and 15 m.

A first suspension means is realized as a cable stocking arrangement as schematically depicted as H1, H2 in FIG. 1. Specifically, each cable L1, L2 wears a cable stocking which is hooked to a bottom of a main frame of the nacelle 3 so as to be rotatable together with the nacelle 3.

A second suspension means 100 in the form of a steel wire is also attached to the bottom of the mainframe of the nacelle 3 by a corresponding fixing 150 in the form of a hook or a nuts and bolts connector.

A plurality of spacer plates 130, 131, 132, 133 is distributed along the second suspension means 100. Each of the spacer plates 130, 131, 132, 133 is of circular shape and includes a central suspension hole I, a plurality of cable through-holes V1, and a plurality of heat transport holes K1. The second suspension means 100 in the form of the steel wire is led through the suspension holes I.

Directly above and below each spacer plate 130, 131, 132, 133 there is a fixing means 33c on the bottom side in the form of a clamping fastener which fixes the respective spacer plates 130, 131, 132, 133 at their different positions on the second suspension means 100 so that they cannot change their respective position. The cables L1, L2 are slidably led through the through-holes V1 of the respective spacer plates 130, 131, 132, 133 such that they run substantially parallel to the second fixing means 100 if they are not twisted by a rotation of the nacelle 3.

The lowermost spacer plate 133 is attached to the tower 2 sidewall via respective fixtures 133a, 133b such that it cannot rotate around a rotation axis of the nacelle 3. Thus, the twisting of the cables will not be transferred to the cable loop L and cannot proceed further down to the region where the cables L1, L2 are rigidly attached to the tower 2 sidewall.

Below the lowermost spacer plate 133 the cables L1, L2 are guided to the sidewall of the tower 2 via a cable loop L and via a supporting cylinder 40. The supporting cylinder 40 is fixed at the sidewall of the tower 2 by a corresponding fixing means 41 denoted by dashed lines in FIG. 1.

Moreover, there is a fixture 50 attached to the sidewall of the tower 2 which fixes the cables L1, L2 in corresponding through-holes 51, 52, e.g. by a clamping mechanism or by cable ties. Thus, the continuation of the tower cabling from the lowermost spacer plate 133 to the tower 2 sidewall is in a conventional manner such as that described above.

Upon rotation of the nacelle 3, the cable loop L can move upwards and downwards trough the cable through-holes V1 along the direction of the arrow P3 so as to vary the free length of the cables L1, L2.

It should be noted that the number and separation of the spacer plates 130, 131, 132, and 133, and the length of the cable loop L (typically 2.5 m) are arranged such that the twist and upward and downward movement of each cable L1, L2 can be absorbed.

Since the lowest spacer plate 133 is not movable, a transfer of the cable twist to the tower 2 sidewall can be prevented.

In operation, the five heat transport holes K1 guarantee undisturbed heat dissipation. Plastic material is advantageous, since it has very good properties regarding the coefficient of friction between each cable and the spacer plate. Since the curvature of the cable through-holes V1 is smooth, an abrasion or damaging of the cables L1, L2 can be prevented.

In the following, the installation of the cable suspension arrangement according to the above explained first embodiments is described.

Initially, the cable suspension arrangement can be temporarily fixed on the platform 20 of the tower 2 or any other part of the tower 2 which is available before the nacelle 3 is mounted on the top of the tower. For example, it is possible to lift the cable suspension arrangement with the fully prepared tower cabling and all loads and spacer plates 130, 131, 132, 133 to the top platform 20 and to temporarily hang it on a suitable hook or other fixing means.

After having mounted a mainframe of the nacelle 3 to the top of the tower 2, the cable suspension arrangement can be mounted on the mainframe of the nacelle 3, and when the mounting of the mainframe is finished, the temporary fixing to the top platform 20 can be removed.

Plug connectors S1, S2 which are the interfaces between the cables L1, L2 and the tower cabling in the nacelle 3 coming from the generator have to be connected in order to establish the electrical connection from the generator to the grid.

Figure 2:
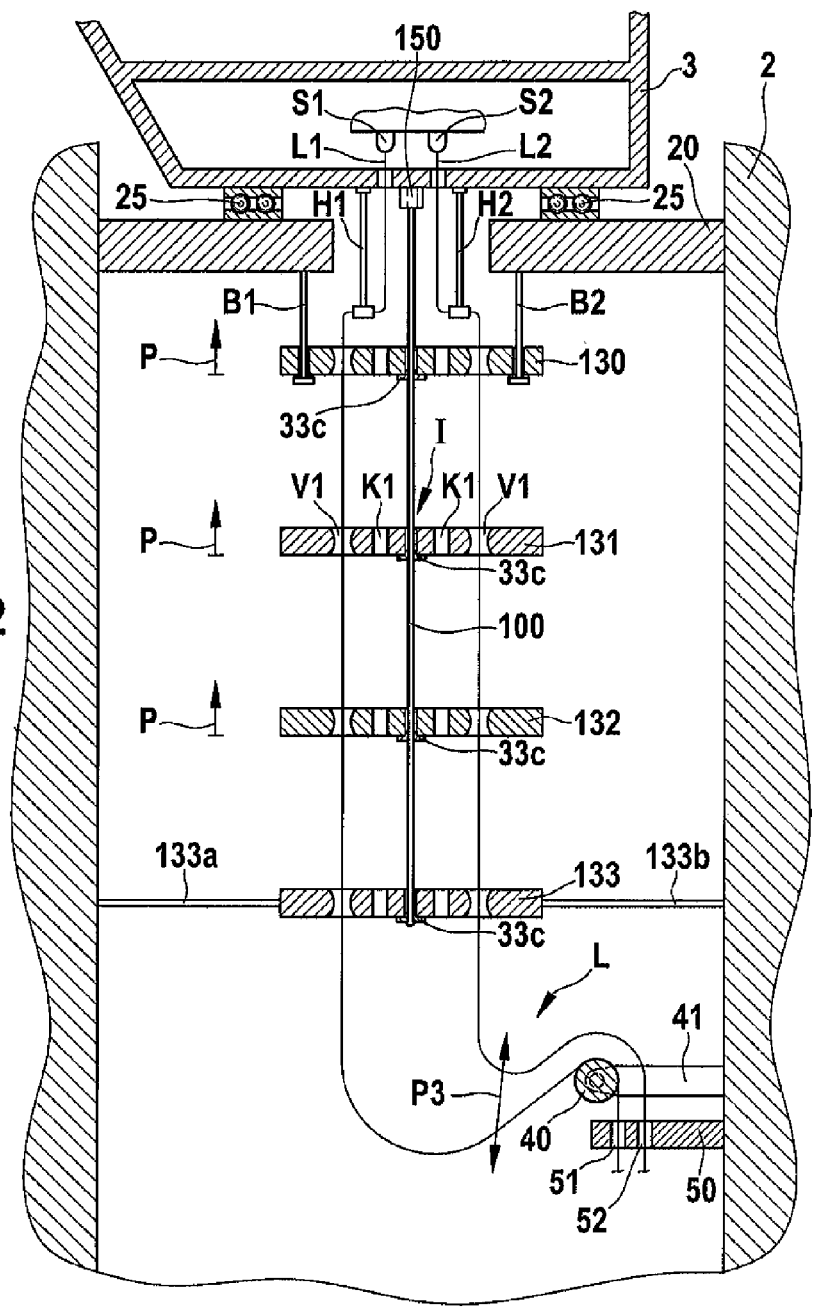
FIG. 2 is a schematic cross-sectional view of another embodiment of a cable suspension arrangement for a wind energy converter.

FIG. 2 is a schematic cross-sectional view of a second embodiment of a cable suspension arrangement for a wind energy converter.

In contrast to the embodiment of FIG. 1, in the embodiment of FIG. 2 the uppermost spacer plate 130 is fixed to the platform 20 of the tower 2. In this arrangement, a twisting of the cables will not be transferred to below spacer plate 130. Bolts B1, B2 can be designed such that they allow an upward motion of the spacer plate 130 into the direction of the platform 20 denoted by an arrow P, however, no rotation along with the nacelle 3.

Moreover, in this second embodiment the spacer plates 130, 131, 132, 133 only comprise a fixing means 33c on the bottom side which fixing means 33c is arranged such that the spacer plates 130, 131, 132, 133 can not lower their respective position, however, can move upwards in the direction of the arrow P if a twisting of the cables L1, L2 occurs due to a rotation of the nacelle 3.

Figure 3:
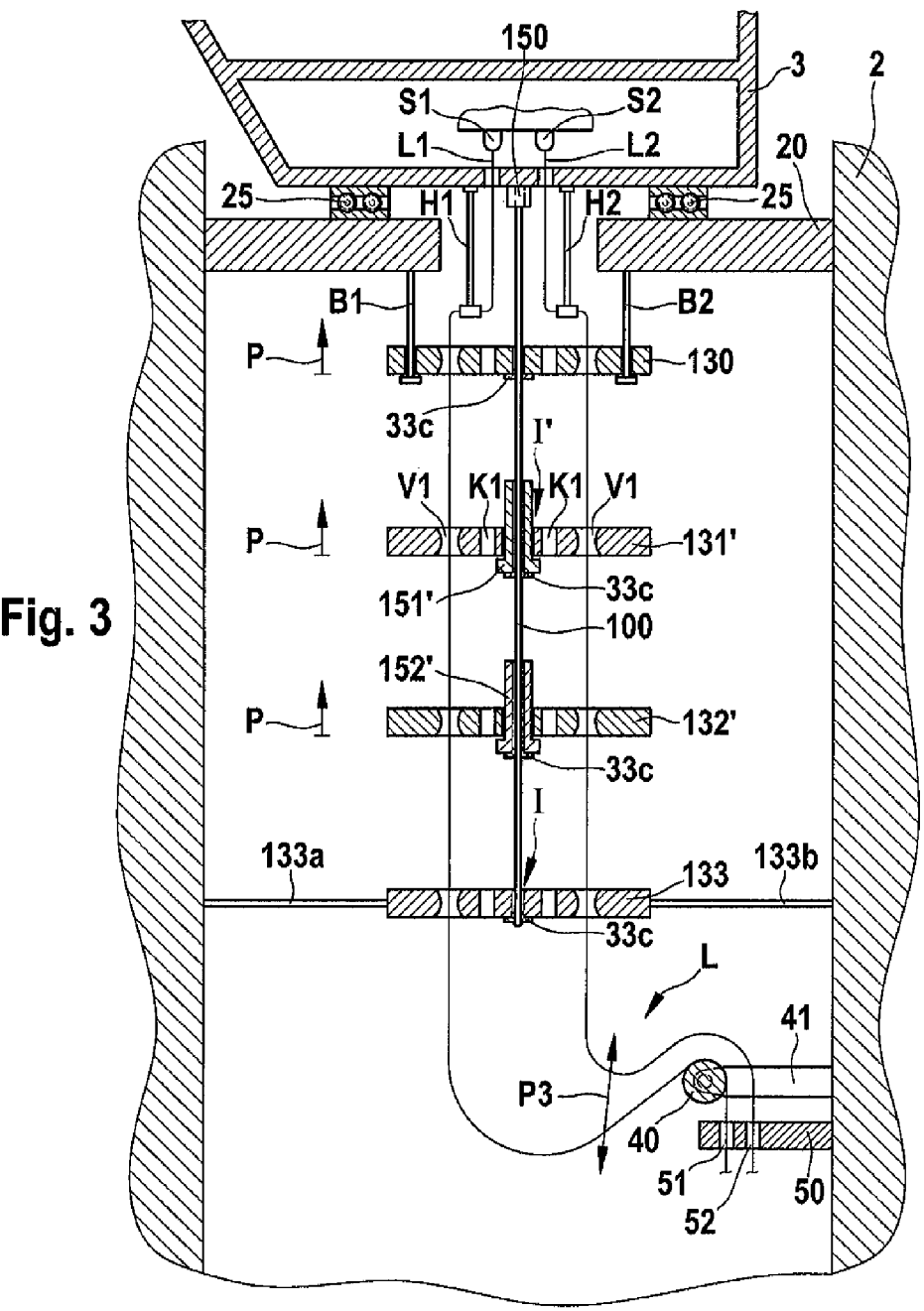
FIG. 3 is a schematic cross-sectional view of a further embodiment of a cable suspension arrangement for a wind energy converter.

FIG. 3 is a schematic cross-sectional view of a third embodiment of a cable suspension arrangement for a wind energy converter.

The third embodiment according to FIG. 3 differs from the above-mentioned second embodiment in that the center hole I' of the spacer plates 131' and 132' is larger than the spacer hole I of the first and second embodiment.

There are further provided guiding means in form of a T-shaped sleeve 151', 152' inserted between the second suspension means 100 and the centre holes I' for improved guiding of an upward motion of the spacer plates 131', 132' along the second suspension means 100.

The respective fixing means 33c of the spacer plates 131', 132' are provided directly below the guiding means 151', 152'.

FIG. 4 is a plain view of a spacer plate which can be used in the embodiments of FIGS. 1 to 3.

Figure 4A:
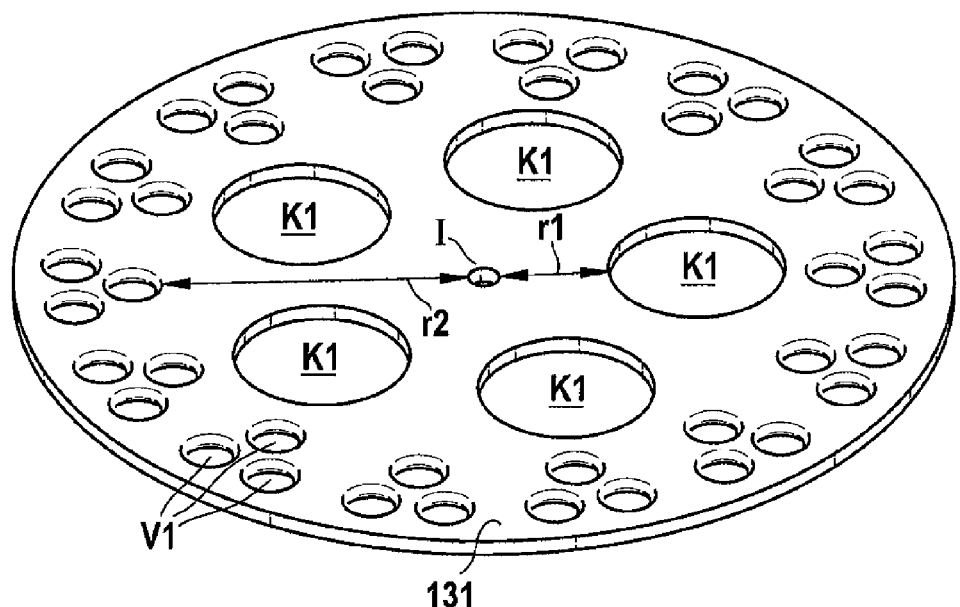
FIG. 4 is a plain view of a spacer plate which can be used in the embodiments of FIGS. 1 to 3.

As shown in FIG. 4a the heat transport holes K1 are distributed between a first and second radius r1, r2 from the centre hole I, and the cable through-holes V1 are distributed beyond the second radius R2 from the centre holes I. Thus, it is possible to provide effective heat convection in order to remove heat from the cables. The distances between the cables are also maximized.

Figure 4B:
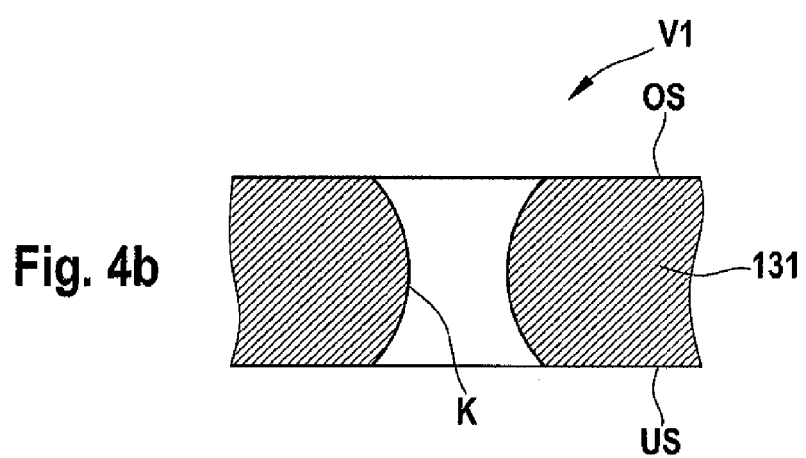
Figure 5:
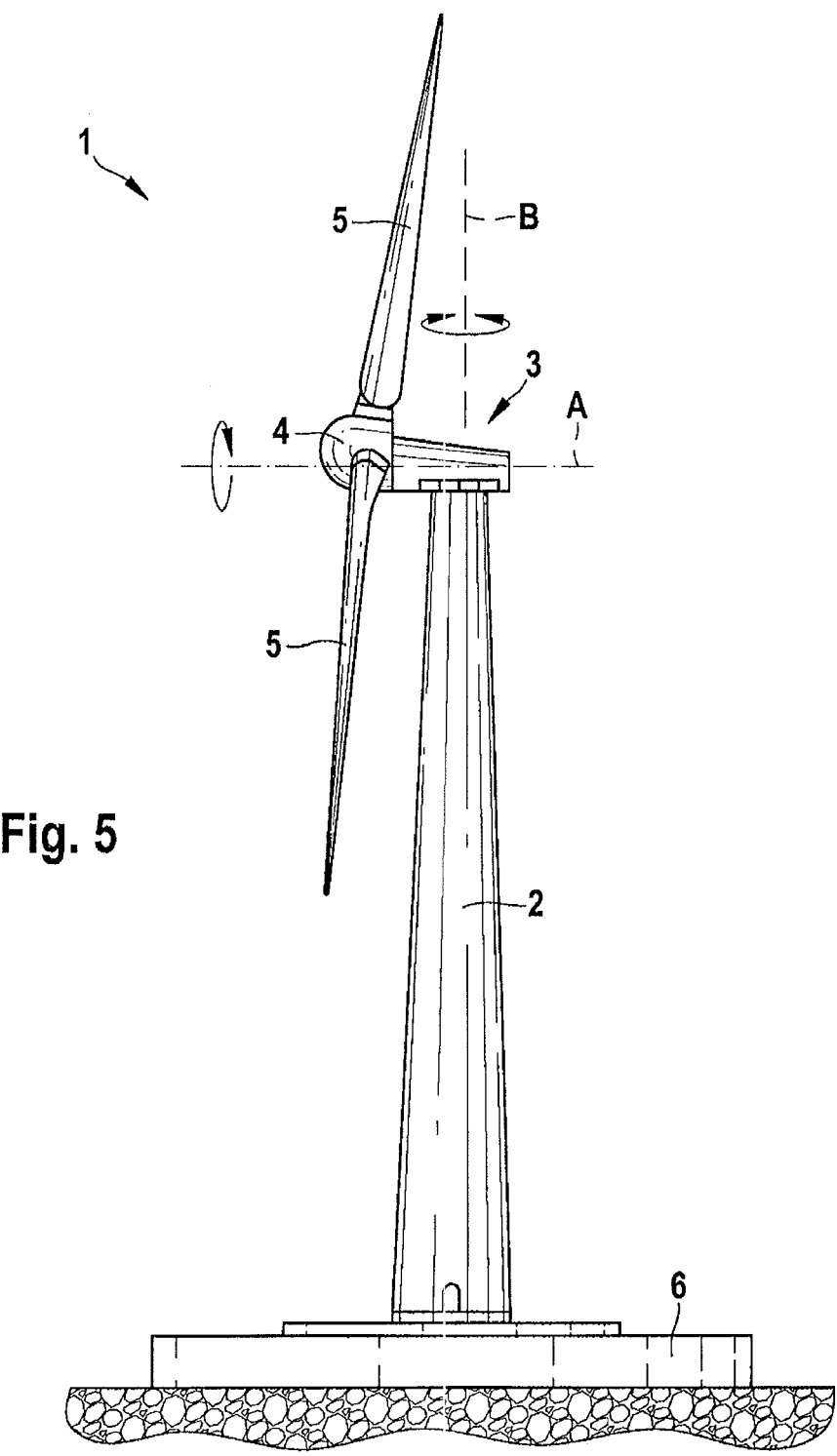
FIG. 5 is a side view showing an example of the conventional overall structure of a wind energy converter.
Figure 6:
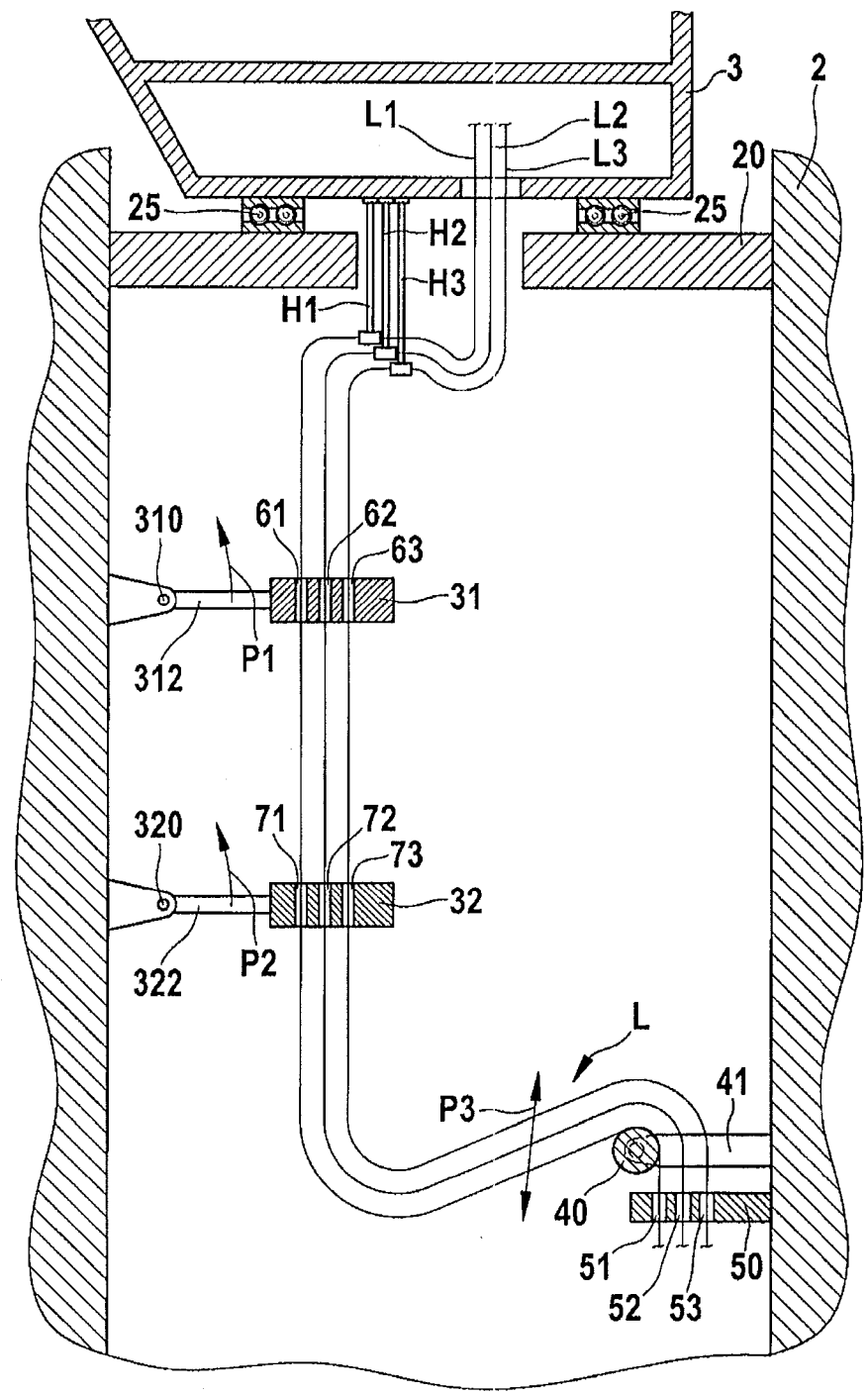
FIG. 6 is an example of a conventional cable suspension arrangement of the wind energy converter of FIG. 5.

Moreover, the cable through-holes V1 exhibit rounded edges at their lower and upper surface US, OS as shown in FIG. 4b such that friction during tilted sliding motion of the cables through the cable through-holes V1 is reduced. In other words, when the cables are twisted and tilted due to the rotation of the nacelle 3, friction along a sharp edge during cable upward or downward motion is prevented and therefore an abrasion and damage of the cable casing can be prevented.

Although the present invention has been described with reference to embodiments, it is not limited thereto, but can be modified in various manners which are obvious for a person skilled in the art. Thus, it is intended that the present invention is only limited by the scope of the claims attached herewith.

Although the above embodiments use a steel wire as second suspension means, it is also possible to use a rope or a similar rod-like construction or similar as second suspension means.

Moreover, the geometry of the spacer plates does not necessarily need to be circular, but can have any other suited shape such as rectangular, trigonal, hexagonal etc.

Moreover, the invention is also not restricted to the form of the first suspension means to be cable stockings, but other suspension means can be used such as clamping means or press-fit connections.

Many other or further modifications that fall in the scope of the present invention will become readily apparent to the skilled person.

The invention claimed is:

1. A cable suspension arrangement of a wind energy converter including a tower and a nacelle provided on the tower, the arrangement comprising:
   a plurality of spacer plates, each including a suspension hole and a plurality of cable through-holes, the plurality of cable through-holes configured to receive a plurality of cables suspended from the nacelle;
   a suspension device attached to the nacelle and led through the suspension holes; and
   a fastener configured to fix the spacer plates at different positions on the suspension device such that they can at least not lower their respective position,
   wherein at least one of the spacer plates is attached to the tower such that the at least one of the spacer plates cannot rotate around a rotation axis of the nacelle,
   wherein the at least one of the spacer plates is the lowermost spacer plate.

2. A cable suspension arrangement of a wind energy converter including a tower and a nacelle provided on the tower, the arrangement comprising:
   a plurality of spacer plates, each including a suspension hole and a plurality of cable through-holes, the plurality of cable through-holes configured to receive a plurality of cables suspended from the nacelle;
   a suspension device attached to the nacelle and led through the suspension holes; and
   a fastener configured to fix the spacer plates at different positions on the suspension device such that they can at least not lower their respective position,
   wherein at least one of the spacer plates is attached to the tower such that the at least one of the spacer plates cannot rotate around a rotation axis of the nacelle,
   wherein the at least one of the spacer plates is the uppermost spacer plate.

3. A cable suspension arrangement of a wind energy converter including a tower and a nacelle provided on the tower, the arrangement comprising:
   a plurality of spacer plates, each including a suspension hole and a plurality of cable through-holes, the plurality of cable through-holes configured to receive a plurality of cables suspended from the nacelle;
   a suspension device attached to the nacelle and led through the suspension holes; and
   a fastener configured to fix the spacer plates at different positions on the suspension device such that they can at least not lower their respective position,
   wherein the suspension device is rod-like.

4. A cable suspension arrangement of a wind energy converter including a tower and a nacelle provided on the tower, the arrangement comprising:
   a plurality of spacer plates, each including a suspension hole and a plurality of cable through-holes, the plurality of cable through-holes configured to receive a plurality of cables suspended from the nacelle;
   a suspension device attached to the nacelle and led through the suspension holes; and
   a fastener configured to fix the spacer plates at different positions on the suspension device such that they can at least not lower their respective position,
   wherein the cable through-holes have rounded edges at the lower and upper surface of the spacer plates.

5. A spacer plate for a cable suspension arrangement for a wind energy converter, the spacer plate comprising:
   a suspension hole; and
   a plurality of cable through-holes,
   the cable through-holes having rounded edges at a lower and upper surface of the spacer plate.

6. The spacer plate of claim 5, further comprising a plurality of heat transport holes.

7. The spacer plate of claim 5, wherein the spacer plate is circular, and wherein the suspension hole is centered on the spacer plate.

8. The spacer plate of claim 6, wherein the heat transport holes are distributed between a first and second radius from the centered suspension hole, and wherein the cable through-holes are distributed beyond the second radius.

\* \* \* \* \*